United States Patent [19]

Putzier

[11] 3,765,983
[45] Oct. 16, 1973

[54] METHOD FOR SOLVENT WELDING PLASTIC PIPE JOINTS

[75] Inventor: Charles William Putzier, Los Angeles, Calif.

[73] Assignee: R & G Sloane Manufacturing Company, Inc., Los Angeles, Calif.

[22] Filed: Mar. 10, 1971

[21] Appl. No.: 122,871

[52] U.S. Cl............ 156/293, 15/104.03, 15/104.04, 15/104.05, 15/104.95
[51] Int. Cl.............................................. B29b 27/00
[58] Field of Search.................. 156/257, 293, 294, 156/295, 296, 307, 308, 310, 314, 83, 305; 117/95, 111 R, 111 A, 111 D, 112; 401/9, 10; 264/341, 343; 285/21, 22, 423, DIG. 16; 15/104.03, 104.04, 104.05, 104.93, 104.94

[56] References Cited
UNITED STATES PATENTS

| | | | |
|---|---|---|---|
| 2,174,214 | 9/1939 | Quinn | 15/104.03 |
| 2,721,159 | 10/1955 | Johnston | 156/293 X |
| 1,087,137 | 2/1914 | Pier | 401/9 |
| 3,086,241 | 4/1963 | Bohn | 401/9 X |
| 3,214,780 | 11/1965 | Sharpe | 401/9 X |
| 2,810,145 | 10/1957 | Corrow | 401/9 X |
| 2,767,417 | 10/1956 | Amen | 401/9 X |

Primary Examiner—Alfred L. Leavitt
Assistant Examiner—Caleb Weston
Attorney—Tipton D. Jennings

[57] ABSTRACT

Leak-free plastic pipe joints are made by methods which utilize specially-designed applicators for applying the primer and solvent cement coatings. Full and thorough coatings are obtained on the mating surfaces of the pipe and fitting, and solvent evaporation prior to joining of these two members is deterred.

9 Claims, 5 Drawing Figures

Patented Oct. 16, 1973 3,765,983

INVENTOR
CHARLES W. PUTZIER

BY Tipton D. Jennings
ATTORNEY

METHOD FOR SOLVENT WELDING PLASTIC PIPE JOINTS

BACKGROUND OF THE INVENTION

The present invention relates to the field of joining pipes and pipe fittings made of a thermoplastic material and more particularly to a novel method for the solvent cementing or welding of plastic pipe joints.

Solvent welding or cementing is a widely-used practice for joining thermoplastic pipes and fittings to provide chemically-fused joints. If care is exercised in the application of solvent primer and/or solvent cement, satisfactory joints can be made with state-of-the-art procedures. However, the use of highly volatile primers and cements and the practice of using conventional paint rollers, daubers, and paint brushes to apply these solvents to the mating surfaces of the pipe and fitting often result in the making of joints which fail. For example, by using any of the foregoing applicators, only a limited surface area can be coated at any one time. Thus, by the time the entire surface is coated, the earlier-applied solvent has begun to evaporate, leaving a dry rather than the required wet surface. This problem becomes aggravated as the diameter of the pipe and fitting increases in size. In addition, some portions of the pipe and fitting surfaces are not readily in the view of the person applying the solvent; and sometimes these portions are not coated or are inadequately coated with the solvent primer or cement. When the pipe and fitting are joined together, any surface on which the solvent has evaporated, or any surface which has not been satisfactorily coated, causes voids in the finished joint where leaks can occur.

SUMMARY OF THE INVENTION

The present invention overcomes these prior-art problems by methods which ensure complete peripheral coverage with solvent cement or primer of the mating portions of the fitting and pipe surfaces, and which prevents the evaporation of the primer or cement prior to union of the pipe and fitting members. Thus, fully wetted and dissolved mating surfaces are brought into contact at union. Specially-designed applicators are used in the practice of these methods. These methods produce solvent-welded plastic pipe joints whose failure rate is greatly reduced when compared with state-of-the-art methods.

It is an object of the present invention to provide an improved method for solvent welding plastic pipe joints.

It is another object of the present invention to provide an improved method for solvent welding plastic pipe joints in which the mating surfaces of the pipe and fitting are fully coated with solvent cement or primer.

It is a further object of the present invention to provide an improved method for solvent-welding plastic pipe joints in which the tendency for the solvent cement or primer to evaporate from the pipe and fitting surfaces prior to assembly is deterred.

It is a still further object of the present invention to provide an improved method for solvent welding of plastic pipe joints which is virtually foolproof so that acceptable pipe joints can be repeatedly produced.

Other objects and advantages of the present invention will become apparent from a reading of the present specification in conjunction with the accompanying drawing.

DESCRIPTION OF THE PREFERRED EMBODIMENT

Figure 1:
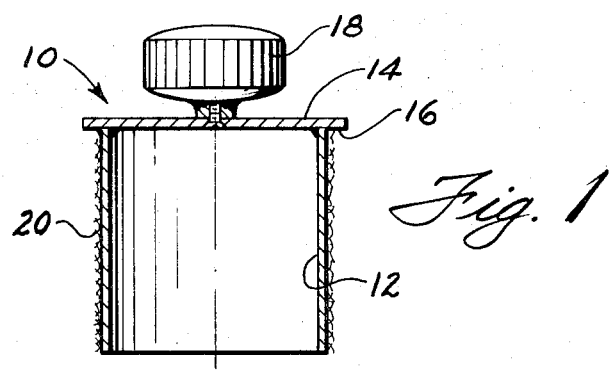
FIG. 1 is a cross-sectional view of a specially-designed applicator used in the practice of the present invention.

In the solvent welding of plastic pipes and fittings, it is the common practice to employ paint brushes, paint rollers, and daubers for applying the solvent primer and/or solvent cement to the appropriate pipe and fitting surfaces. In the actual preparation of the pipe and fitting members, the pipe is first cut to the proper size and the mating end is chamferred. Afterwards, any dirt, moisture, or grease is removed from both the pipe and fitting socket; and these two components are now ready for the application of solvent. The socket surface of the fitting is usually first coated with a solvent which attacks and dissolves this surface. Next, the external surface of the pipe at the end which is to be inserted into the socket is coated with a solvent so that this surface is also dissolved. The coated end of the pipe is now inserted into the coated fitting socket until it bottoms in the socket. If possible, the pipe is rotated at least a one-quarter turn so that the dissolved surfaces of the pipe and fitting will intermingle. As the solvent evaporates, a chemically-fused joint should result.

It is essential to the making of a successful joint that both the inside socket surface and the outside surface of the pipe are soft and wet with solvent cement when the two members are joined together and the coated surfaces are brought into superimposed contact. If the solvent has evaporated from a portion of either surface, or if any part of either mating surface is omitted or inadequately coated when the coating is applied, the chances are that the joint, once it is made, will eventually leak and thus fail.

The solvents which are used are quite volatile; and it is often found that due to the time which is consumed by coating both the fitting and pipe surfaces with the applicators now in use, it is necessary to recoat the fitting surface because the solvent has begun to evaporate. In fact, after recoating this surface, it might be necessary now to recoat the pipe surface because it also has begun to dry out.

For the larger sizes of pipes and fittings, it is often necessary to have one person coating the fitting with solvent and another person coating the pipe end with solvent to reduce the likelihood of the solvent evaporating prior to union of the pipe and fitting. But even here, the application of the solvent is a time-consuming operation requiring the stroking or rolling of the solvent onto the surfaces of the pipe and fitting; and it is often found that the portion of the surface which is first coated may be nearly dry by the time the coating of the surface is completed. Thus, it will require recoating of the dried-out surface portions and close coordination between the working partners so that both surfaces will be wet and soft at the time of union. Otherwise, the possibility of joint failure is present.

In the welding of certain types of thermoplastics, it is necessary to apply two separate coatings to ensure that the mating surfaces are dissolved. A primer is first applied to both the pipe and fitting surfaces so that the dense surface is actually penetrated and dissolved by the primer solvent. This primer must be applied liberally and with a scrubbing motion to ensure that the pipe and fitting surfaces are actually dissolved and not just softened. To keep these surfaces wet and workable, fresh solvent must be repeatedly added to the surfaces. A coating of solvent cement is next applied to at least one of the surfaces, usually that of the pipe; and this cement coating must be kept wet so that the pipe surface will stay in solution until the joint is made. Thus, with the necessity to apply coatings and recoatings of solvent primer and solvent cement in the manner just described, there is a distinct possibility of solvent evaporation at some portion or portions of one or both surfaces which is not detected; and a leaky joint can result.

Figure 2:
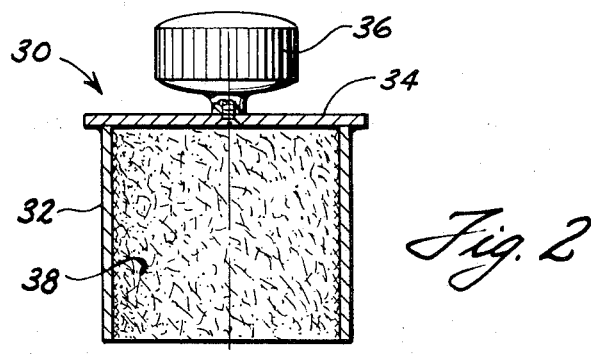
FIG. 2 is a cross-sectional view of another specially-designed applicator used in the practice of the present invention.

The present invention overcomes the problems of the prior art by novel methods which utilize applicators of the type shown in FIGS. 1 and 2 in their practice. With reference first to these figures, FIG. 1 shows in cross-section an applicator 10 having a cylindrical body 12 which is here shown as a thin tubular shell, although the body could be of thicker construction or even solid, if preferred. The body 12 is made of metal, plastic, rubber, or other suitable material and is shown as attached at its top to a cap 14 which closes one end of the body. The cap is shown as being of a greater width than body 12 so that its outer edge 16 overlaps the cylindrical surface of body 12. A handle 18 is centrally-attached to cap 14 to facilitate the use of the applicator.

The outer surface of body 12 is completely covered with a material 20 which is capable of absorbing or holding the solvent to be used in making the joint. Illustrated as suitably attached to body 12 is a fabric with a napped surface such as a velour of the type commonly used as the surface of paint rollers. By way of example, other suitable materials which can be attached or formed on body 12 include bristles and sponges. The material selected should be resistant to the solvents which are applied. By virtue of placing the material 20 on the outer surface of body 12, applicator 10 is designed for use in applying solvents to the inside surface of plastic pipe fittings.

FIG. 2 shows an applicator 30 similar in construction to applicator 10 in FIG. 1. The body 32 is again shown as being of tubular construction and closed at its upper end by a cap 34. A handle 36 is attached to the cap. The material 38 which absorbs or holds the solvent completely covers the inner cylindrical surface of body 32. The materials used in the construction of applicator 30 are the same as those suitable for applicator 10. Applicator 30 is designed for applying solvents to the outer end surface of plastic pipes.

Figure 1A:
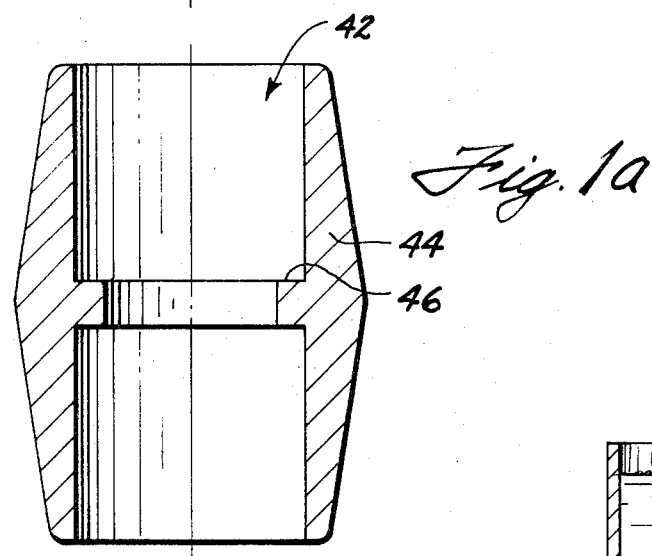
FIG. 1a is a cross-sectional view of an example of a plastic pipe fitting which forms one member of a plastic pipe joint.
Figure 3:
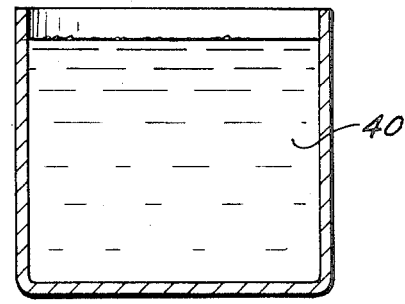
FIG. 3 is a cross-sectional schematic view of a receptacle containing a solvent.

In the method of solvent welding plastic pipe joints according to the present invention, the pipe and fittings are first selected and prepared for solvent welding, the same as is presently done. With reference now to the FIGURES, the applicator 10 is dipped or placed in a receptacle containing the desired solvent 40, such as shown in FIG. 3, in order that the material 20 becomes thoroughly soaked or saturated with solvent. The applicator 10 is now withdrawn from the receptacle; and the body end is inserted into the socket 42 of a plastic pipe fitting 44, such as the example shown in FIG. 1a. The diameter of the body 12 is sized to fit socket 42 so that the material 20 simultaneously contacts an entire opposed peripheral or annular surface of the socket 42 as the applicator is inserted and begins to release the solvent on this contacted surface. The depth of applicator 10 is preferably at least equal to the depth of the socket so that upon insertion, the applicator can be bottomed against shoulder 46 and the entire cylindrical socket surface coated with solvent.

After insertion, the applicator 10 is preferably rotated within socket 42 while at the same time reciprocated therein. By reciprocation is meant that the applicator 10 is partially but not fully withdrawn from the socket and is then pushed back into the socket until it bottoms or abuts against shoulder 46. The rotation and reciprocation simulate a scrubbing motion which helps to ensure that the solvent thoroughly coats and penetrates the socket surface. After the surface of the socket has been thoroughly coated, the applicator 10 is permitted to remain fully inserted into the socket so that the surface will keep wet and workable.

Figure 2A:
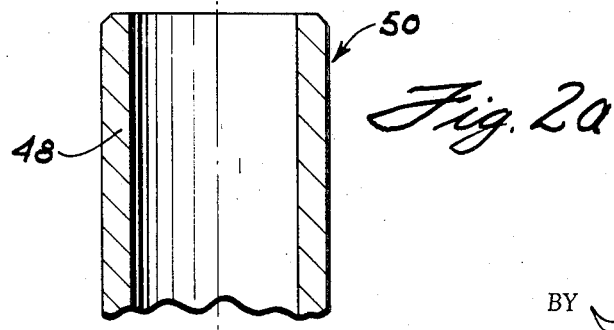
FIG. 2a is a cross-sectional view of an example of a plastic pipe which forms one member of a plastic pipe joint.

The applicator 30 is now dipped or placed in a receptacle, such as shown in FIG. 3, so that its material 38 also becomes saturated with solvent. The applicator is withdrawn from the receptacle; and the body opening is pushed over the end of the piece of plastic pipe 48, such as depicted in FIG. 2a. The inside diameter of body 32 is sized to fit pipe 48 so that the material 38 on its inner surface simultaneously contacts an entire opposed peripheral or annular surface 50 of the pipe end, and begins to release the solvent on this surface. The depth of applicator 30 is preferably at least equal to the depth of the mating surface of the pipe 48 so that after the applicator is pushed onto pipe 48, it can be advanced over the pipe surface until the end face of the pipe bottoms against the underside of cap 34. In this manner, the entire mating surface of the pipe is coated with solvent. Applicator 30 is preferably rotated and reciprocated in the same manner as described with reference to applicator 10 to ensure that the entire mating surface 50 of pipe 48 is thoroughly coated with and penetrated by the solvent.

Once the mating surfaces of fitting 44 and pipe 48 are soft and wet, they are ready to be joined. The applicators 10 and 30 are removed, respectively, from the fitting 44 and pipe 48; and the pipe 48 is now inserted into socket 42 until the pipe bottoms in the socket. If possible, the pipe 48 should be given at least a one-quarter turn.

When the fitting and pipe are joined together, their coated surfaces are brought into superimposed contact and the dissolved plastic surfaces intermingle. The joint is now preferably held together for a very short period of time until the solvent evaporates to the point where the dissolved surfaces thicken and firmly grip one another. A solid, fused joint results. A properly welded joint will normally display a bead around its entire perimeter.

Where there is only one coating to be applied to each of the pipe and fitting surfaces, the solvent used is a solvent cement. This cement both attacks the surface of the plastic and provides sufficient body so that upon union of the pipe and fitting, the mating surfaces of the pipe and fitting are intermingled and mixed with the residual body of the cement. The use of the applicators described herein ensures a full and even coating of solvent cement about the entire surfaces of the mating portions of the pipe and fitting; and by permitting the bodies of these applicators to remain in contact with the dissolved surfaces until just before the joint is to be made, the solvent does not evaporate.

The use of the present method reduces the time that it takes to solvent-weld a joint in comparison with the conventional technique where coating and recoating with a brush, dauber or paint roller is required. Furthermore, there is now no concern whether the hard-to-view surface portions are coated because the method ensures that the entire mating surfaces are fully coated.

The aforedescribed welding method finds particular application in the solvent welding of plastic pipes and fittings made of a solvent-soluble plastic such as polyvinyl chloride (PVC), acrylonitrile-butadiene-styrene polymers (ABS), or chlorinated polyvinyl chloride (CPVC), by way of example. The solvent cement which is selected usually comprises a solution of the polymer, of which the pipe and fitting are made, in a suitable solvent such as tetrahydrofuran, cyclohexanone, and dimethyl formamide, or combinations thereof, by way of example. The dissolved polymer gives the necessary body to the cement.

In the solvent welding of PVC pipes and fittings, it is generally felt advisable to first treat the mating surfaces with a coating of primer solvent or mixture of primers to soften and dissolve these surfaces prior to the application of the solvent cement. When a primer is used, it is usually necessary afterwards to apply the solvent cement only to one of the members and generally the pipe is chosen. The primer-coated surface must be wet and soft at the time of application of the solvent cement coating, and all surfaces must remain wet and soft until the pipe and fitting are joined.

The present invention is ideally suited to situations where such multiple coatings are used. Therefore, as an alternative embodiment, once the mating surfaces of the fitting socket and pipe have been thoroughly wetted and dissolved by the applied solvent, as described in the previous embodiment, the applicator 30 is removed from the end of pipe 48. Solvent cement is now immediately applied to this wet surface. As soon as the pipe surface is fully coated with the solvent cement, the applicator 10 is withdrawn from the fitting 44; and the pipe 48 is inserted into the socket 42 to form the joint. Again, if possible, at least a one-quarter turn should be given to the pipe. In the application of the solvent cement, a brush, dauber, roller or other conventional applicator can be used. However, it is preferred that an applicator such as shown in FIG. 2 whose material 38 is saturated with solvent cement is used.

In the case where both the fitting and pipe are to receive multiple coatings, it is usually the practice to apply a particular coating to both the fitting and pipe before proceeding to the successive coating. In such case, the applicator used to apply a coating is permitted to remain engaged with the coated surface until the next successive coating is to be applied or until the time arrives to join the two members. These steps are necessary to prevent evaporation on the surface of one member while the surface on the other member is being coated.

The solvent primer which can be used is any conventional liquid composition which prepares the surface of the plastic for satisfactory adhesive bonding. Generally, the primer is made of the same solvent used in the solvent cement, but this is not a strict requirement. Example of solvents which can be used as primers include tetrahydrofuran, cyclohexanone, and dimethyl formamide, or compositions thereof.

When either an applicator 10 or 30 is to be used to apply a solvent cement, it may be necessary to modify the construction of the applicator so that excessive amounts of the highly viscous cement are not applied. Instead of covering the entire body of an applicator with the material 20 (or 38), an annular band of material is used instead. This band preferably covers the surface of the applicator body at its forward end so that the entire mating surface of the fitting 44 or of the pipe 48 is still coated with solvent cement when the applicator is bottomed. By having the band of material cover only a partial-depth portion of the applicator body rather than the entire depth, a lesser amount of solvent cement can be carried or absorbed by this material; and thus, a lesser amount is applied to the pipe or fitting surface.

In using an applicator of the type shown in either FIGS. 1 and 2 to apply solvent cement, it is preferred to follow the step of rotating and reciprocating the applicator after it is brought into contact with its respective fitting or pipe surface to ensure that the surface is thoroughly coated with solvent cement.

The methods described herein are particularly adaptable for use in the color bond surveillance system described in the co-pending McColgan et al. application U.S. Ser. No. 108,204, filed 20 January 1971, and assigned to the assignee of the present invention. In the system described in that co-pending application, the multiple coatings which are applied to the pipe and fitting contain separate, reactive, color-precursor components. When these coatings are properly and successively applied and the coated surfaces brought into superimposed contact, the reactive color-precursor components are brought into contact to form a desired color. Omission of a required coating, its improper application, or the evaporation of solvent prior to contact, will not result in the desired color change. As long as the coatings remain wet, reaction and migration of the reactive color-precursor components will be facilitated. By following the methods taught herein, full and complete coatings of the mating surfaces of the pipe and fitting are obtained, evaporation is avoided, and the desired color change will occur to indicate that a satisfactory joint has been made.

Although this invention has been described with reference to illustrative embodiments thereof, it will be apparent to those skilled in the art that the principles of this invention can be embodied in other forms but within the scope of the claims.

What is claimed is:

1. In a method for the solvent welding of a plastic pipe and a plastic fitting into a fused joint wherein at least one solvent coating is separately applied to the mating surfaces of the pipe and fitting members prior to the union of these members, the improvement comprising the steps of:

a. applying said solvent coating simultaneously to at least an entire annular portion of the mating surface of one of said members by the use of a first solvent applicator having an outer solvent-holding surface which is sized to contact simultaneously at least an entire annular portion of the mating surface of said one member;

b. applying said solvent coating simultaneously to at least an entire annular portion of the mating surface of the other of said members by the use of a second solvent applicator having an inner solvent-holding surface which is sized to contact simultaneously at least an entire annular portion of the mating surface of said other member; and c. thereafter bringing the aforesaid members into union while these surface portions are wet with solvent, thereby to form the fused joint.

2. In a method as claimed in claim 1, the additional steps of:

a. rotating said first solvent applicator while in contact with the annular portion of the mating surface of said one member; and b. rotating said second solvent applicator while in contact with the annular portion of the mating surface of said other member.

3. In a method as claimed in claim 2, the additional steps of:

a. reciprocating said first solvent applicator while in contact with the annular portion of the mating surface of said one member; and b. reciprocating said second solvent applicator while in contact with the annular portion of the mating surface of said other member.

4. In a method as claimed in claim 3, wherein:

a. said solvent coating is a solvent cement coating.

5. In a method as claimed in claim 1, wherein:

a. said solvent coating is applied simultaneously to substantially the entire mating surface of one of said members by the use of a first solvent applicator having an outer solvent-holding surface which is sized to contact simultaneously the entire mating surface of said one member; and b. said solvent coating is applied simultaneously to substantially the entire mating surface of the other of said members by the use of a second solvent applicator having an inner solvent-holding surface which is sized to contact simultaneously the entire mating surface of said other member.

6. In a method as claimed in claim 5, the additional steps of:

a. permitting said first solvent applicator to remain in contact with the mating surface of said one of said members after the application of the coating thereto, while said solvent coating is applied to the other of said members; and b. removing said first solvent applicator from said contact with said mating surface of said one of said members just prior to bringing the afore-said members into union.

7. In a method as claimed in claim 6, wherein:
a. said solvent coating is a solvent cement coating.

8. In a method as claimed in claim 6, wherein:
a. said solvent coating is a solvent primer coating.

9. In a method as claimed in claim 6, wherein:
a. the coating applied to both of said members is a solvent primer;

and comprising the additional step of:

b. applying a solvent cement coating to the mating surface of the other of said members subsequent to the application of said solvent primer and prior to bringing the aforesaid members into union.

* * * * *